(12) United States Patent
Willis

(10) Patent No.: US 12,246,653 B2
(45) Date of Patent: Mar. 11, 2025

(54) SLIDE OUT DEVICE FOR VEHICLE

(71) Applicant: Adrian Steel Company, Adrian, MI (US)

(72) Inventor: Thomas Michael Willis, Petersburg, MI (US)

(73) Assignee: Adrian Steel Company, Adrian, MI (US)

( * ) Notice: Subject to any disclaimer, the term of this patent is extended or adjusted under 35 U.S.C. 154(b) by 314 days.

(21) Appl. No.: 18/062,625

(22) Filed: Dec. 7, 2022

(65) Prior Publication Data

US 2023/0182651 A1 Jun. 15, 2023

Related U.S. Application Data

(60) Provisional application No. 63/265,311, filed on Dec. 13, 2021.

(51) Int. Cl.
*B60R 11/00* (2006.01)

(52) U.S. Cl.
CPC ....... *B60R 11/00* (2013.01); *B60R 2011/0036* (2013.01); *B60R 2011/0084* (2013.01)

(58) Field of Classification Search
CPC ..... B60R 2011/0084; B60P 1/003; E05C 3/16
USPC .................. 296/26.09; 414/522; 292/36, 221; 224/402–405
See application file for complete search history.

(56) References Cited

U.S. PATENT DOCUMENTS

| | | |
|---|---|---|
| 1,353,453 A | 9/1920 | Chipperfield |
| 1,819,621 A | 8/1931 | Rand, Jr. |
| 2,094,401 A | 9/1937 | Girl |
| 2,277,702 A | 3/1942 | Kennedy |
| 2,655,422 A | 10/1953 | Gussack |
| 2,728,626 A | 12/1955 | Gussack |
| 2,739,027 A | 3/1956 | Gussack |
| 2,966,384 A | 12/1960 | Bergman |
| 3,028,025 A | 4/1962 | White |
| 3,132,755 A | 5/1964 | Greenslate |
| 4,072,375 A | 2/1978 | Boone |
| 4,092,056 A | 5/1978 | Signore et al. |
| 4,509,810 A | 4/1985 | Erlam et al. |
| 4,681,360 A | 7/1987 | Peters et al. |
| 4,824,158 A | 4/1989 | Peters et al. |
| 4,872,734 A | 10/1989 | Rechberg |
| 4,909,558 A | 3/1990 | Roshinsky |
| 4,936,691 A | 6/1990 | Reiss, Jr. |
| 4,950,123 A | 8/1990 | Brockhaus |
| 5,046,913 A | 9/1991 | Domek et al. |
| 5,209,572 A | 5/1993 | Jordan |
| 5,513,941 A | 5/1996 | Kulas et al. |
| 5,626,405 A | 5/1997 | Banks |
| 5,934,725 A | 8/1999 | Bowers |
| 5,944,371 A | 8/1999 | Steiner et al. |
| 5,961,193 A | 10/1999 | Hobbs |
| 6,318,780 B1 | 11/2001 | St. Aubin |

(Continued)

*Primary Examiner* — Justin M Larson

(74) *Attorney, Agent, or Firm* — Marshall & Melhorn, LLC

(57) ABSTRACT

A locking system for a vehicle slide out device may have a paddle having a body portion and a flange portion. The system may also have a lever connected to the paddle where the lever has a locking pawl, and at least one pivot aperture. The system may also have a lever support located adjacent the lever, where the lever support may have at least one pivot extending through the at least one pivot aperture. The system may also have a frame member having a plurality of notches selectively aligned with the locking pawl.

16 Claims, 4 Drawing Sheets

(56) References Cited

U.S. PATENT DOCUMENTS

| | | |
|---|---|---|
| 6,328,364 B1 | 12/2001 | Darbishire |
| 6,390,525 B2 | 5/2002 | Carpenter et al. |
| 6,390,574 B2 | 5/2002 | Fraccaro |
| 6,491,331 B1 | 12/2002 | Fox |
| 6,659,524 B1 | 12/2003 | Carlson |
| 6,749,276 B2 | 6/2004 | Judge et al. |
| 6,758,508 B2 | 7/2004 | Weyhrich |
| 7,121,603 B2 | 10/2006 | Stevenson et al. |
| 7,159,917 B2 | 1/2007 | Haaberg |
| 7,325,845 B2 | 2/2008 | Bartos et al. |
| 7,393,036 B2 | 7/2008 | Bastian et al. |
| 7,543,872 B1 | 6/2009 | Burns et al. |
| 8,763,820 B2 | 7/2014 | Hanley |
| 8,801,121 B2 | 8/2014 | Tosin |
| 9,010,830 B2 | 4/2015 | Hanley |
| 9,227,547 B2 | 1/2016 | Williams |
| 9,233,647 B1 | 1/2016 | Hanley et al. |
| 9,238,429 B2 | 1/2016 | Bluhm |
| 9,381,872 B2 | 7/2016 | Hanley |
| 9,387,891 B2 | 7/2016 | Richins |
| 9,610,881 B2 | 4/2017 | Williams |
| 9,669,773 B2 | 6/2017 | Hanley |
| 9,796,339 B2 | 10/2017 | Hanley et al. |
| 9,834,149 B2 | 12/2017 | Hanley |
| 10,106,094 B2 | 10/2018 | Hanley |
| 10,167,025 B2 | 1/2019 | Richins |
| 10,167,028 B2 | 1/2019 | Martinez Romero et al. |
| 10,172,452 B2 | 1/2019 | Hanley et al. |
| 10,334,944 B2 | 7/2019 | Hanley |
| 10,440,854 B2 | 10/2019 | Yoneda |
| 10,610,012 B2 | 4/2020 | Hanley et al. |
| 10,703,292 B2 | 7/2020 | Hanley |
| 10,814,793 B2 | 10/2020 | Harrell et al. |
| 10,913,398 B2 | 2/2021 | Hanley |
| 11,000,123 B2 | 5/2021 | Hanley et al. |
| 11,560,183 B2 | 1/2023 | Agarwal et al. |
| 2002/0105201 A1 | 8/2002 | Melotik et al. |
| 2005/0161964 A1 | 7/2005 | Adleman, Jr. |
| 2006/0066187 A1 | 3/2006 | Chang |
| 2013/0341949 A1 | 12/2013 | Bernthisel |
| 2021/0129922 A1 | 5/2021 | Agarwal et al. |
| 2021/0146849 A1 | 5/2021 | Hanley |
| 2021/0219716 A1 | 7/2021 | Hanley et al. |
| 2023/0150585 A1 | 5/2023 | Agarwal et al. |

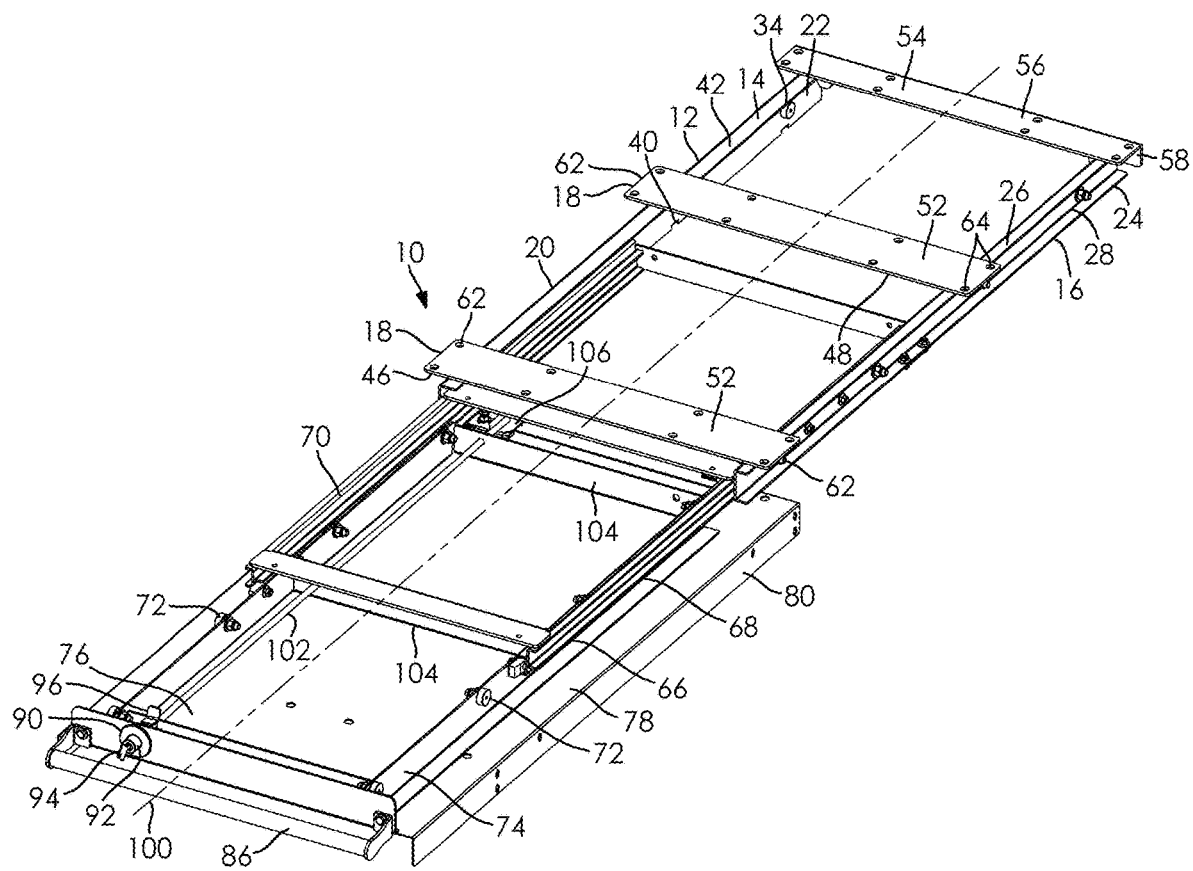

SLIDE OUT DEVICE FOR VEHICLE

FIELD

One embodiment of a slide out device for a vehicle is depicted and described. The slide out device may be such as a tray, a drawer or shelf but other structures are permissible.

BACKGROUND

It is well-known to use vehicles for the transportation of various items. For example, trucks and vans are known in the trade industry to transport the tools and goods trades people use to do, and as a product of, their jobs. How the tools and goods are stored and accessed in such vehicles, however, is in need of significant improvement. In some vehicles, there is no provision for providing easy access to items within the vehicle. For example, in pickup trucks, items located in the cargo area can be difficult to reach because of the sidewalls and the tail gate about the bed, and because of the length of the bed. In addition, the items in the cargo area may become haphazardly located, as a result of loading and/or transport, in the vehicle where they can become damaged, or damage the vehicle.

In view of the disadvantages associated with the prior art, it would be advantageous for a vehicle to have a robust device that provide access to the cargo area. The device might be selectively moveable from a storage or transport condition to at least a partially deployed condition to provide the access.

SUMMARY

In one embodiment, a locking system for a vehicle slide out device may have a paddle having a body portion and a flange portion. The system may also have a lever connected to the paddle wherein the lever has a locking pawl, and at least one pivot aperture. The system may also have a lever support located adjacent the lever, the lever support may have at least one pivot extending through the at least one pivot aperture. The system may also have a frame member having a plurality of notches selectively aligned with the locking pawl.

In another aspect, a locking system for a vehicle slide out device may have a paddle having a flange portion. The system may also have a lever at least partially overlapping the paddle wherein the flange portion contacts a first portion of the lever. The second end portion of the lever may have a locking pawl. The lever may also have first and second pivot apertures. The first and second pivots may extends through the first and second pivot apertures, respectively. A biasing member may be connected to the lever between the first portion and the second portion.

In another aspect, a locking system for a vehicle slide out device may have a lock bar having a first end portion and a second end portion. The system may also have a lock device located at the first end portion of the lock bar. The system may also have a paddle located at the second end portion of the lock bar. The system may also have a lever connected to the paddle wherein the lever has a locking pawl, first and second pivot apertures and a first biasing member connection. The system may also have a lever support located adjacent the lever, the lever support having first and second pivots extending through the first and second pivot apertures, respectively, and a second biasing member connec- tion. The system may also have a biasing member extending between the first biasing member connection and the second biasing member connection.

BRIEF DESCRIPTION OF THE DRAWINGS

The above, as well as other advantages, will become readily apparent to those skilled in the art from the following detailed description when considered in the light of the accompanying drawings in which:

FIG. 3 is a lower, schematic, perspective view of the device in the deployed condition;

FIG. 4 is a lower, schematic, perspective view of the device from FIG. 1;

DETAILED DESCRIPTION OF THE PREFERRED EMBODIMENTS

It is to be understood that the device may assume various alternative orientations and step sequences, except where expressly specified to the contrary. It is also to be understood that the specific devices and processes illustrated in the attached drawings, and described in the following specifi- cation are simply exemplary embodiments. Hence, specific dimensions, directions or other physical characteristics relat- ing to the embodiments disclosed are not to be considered as limiting, unless stated otherwise.

Turning now to the figures, one embodiment of a slide out device 10 for a vehicle is schematically depicted. The slide out device 10 may be used in any vehicle including aircraft, as well as land or water based vehicles. In one embodiment, the device 10 may be adapted for use with land vehicles, such as cargo vehicles, including, but not limited to, pick-up trucks and vans. The slide out device 10 may be used in non-vehicular applications as well.

Figure 1:
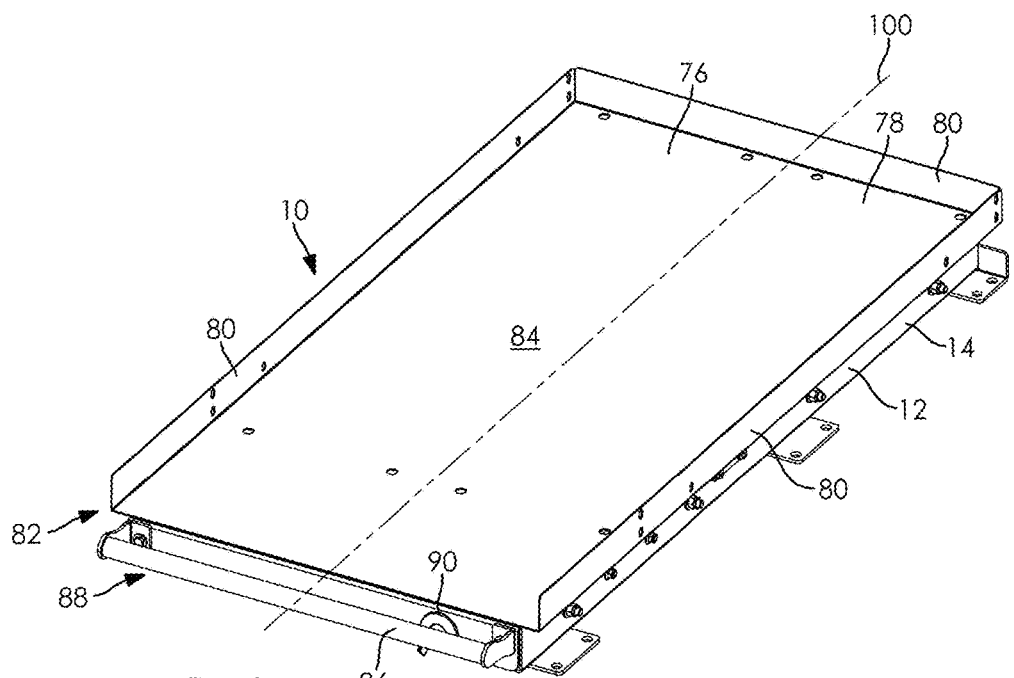
FIG. 1 is an upper, schematic perspective view of one embodiment of a slide out device for a vehicle in a transport condition.
Figure 2:
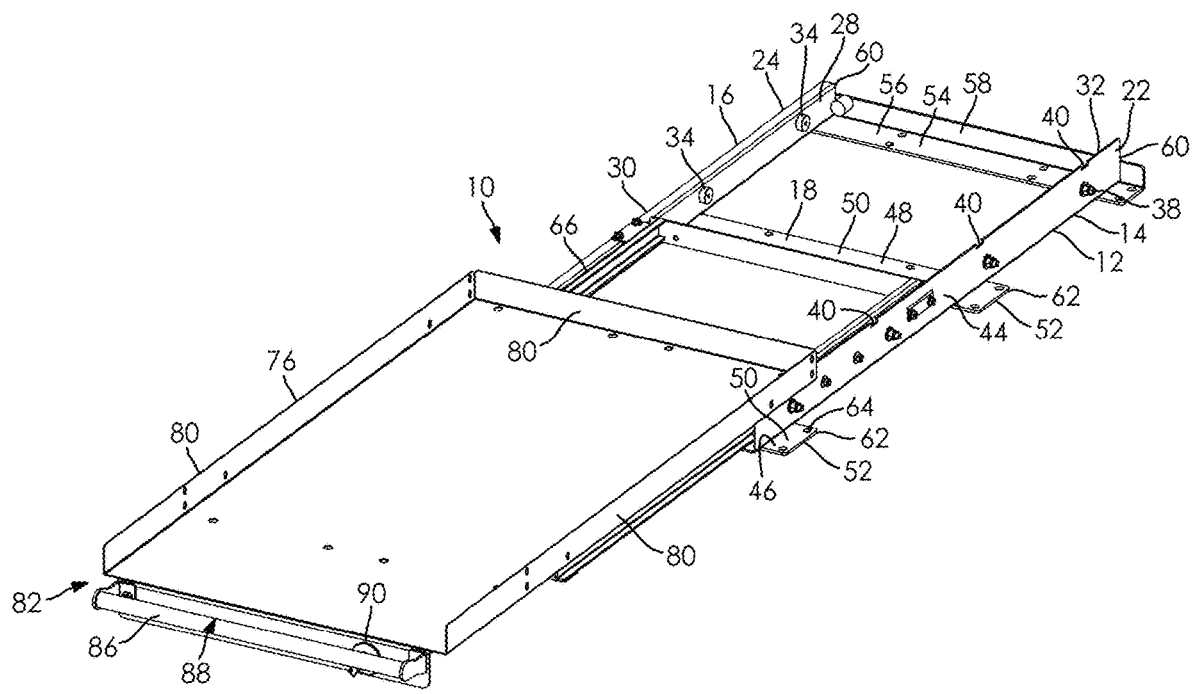
FIG. 2 is an upper, schematic, perspective view of the device from FIG. 1 in a deployed condition.

In some embodiments, such as shown in FIGS. 2 and 3, the slide out device 10 may have a first frame 12. The first frame 12 may be comprised of first and second side rails 14, 16 and at least one cross-piece 18. The first and second side rails 14, 16 may substantially be the same or they may be different in size, shape and/or construction. The first and second side rails 14, 16 may extend substantially parallel one another for at least part of their extension, if not all of their extension. The two side rails 14, 16 may be substan- tially equal in their length.

In some embodiments, the first side rail 14 may have an L-shaped construction with a first lower leg 20 and a second transverse leg 22. The first lower leg 20 may be directed inwardly on the first frame 12. The legs 20, 22 may extend substantially the length of the first side rail 14.

The second side rail 16 may have a C-shaped construction with upper and lower legs 24, 26 connected together by a transverse central flange 28. The upper and lower legs 24, 26 may be substantially parallel one another, and the legs 24, 26 and the central flange 28 may extend substantially the length of the second side rail 16.

In some embodiments, the first lower leg 20 of the first side rail 14 may be coplanar with the lower leg 26 of the second side rail 16. Further, an upper edge 30 of the upper leg 24 of the second side rail 16 may be coplanar with an upper edge 32 of the second transverse leg 22 of the first side rail 14.

Rollers 34 may be connected to both the first and second side rails 14, 16. The rollers 34 may be such as bushings, bearings, wheels, or other related devices. In another embodiment, friction reducing materials may be used separately or in addition to the rollers 34. The friction reducing materials may be such as acetal plastic, but other materials may be used.

The rollers 34 may be attached to the central flange 28 of the second side rail 16 and the second transverse flange 22 of the first side rail 14. In one embodiment, the rollers 34 are arranged in pairs along the first and second side rails 14, 16 such that a roller 34 on the first side rail 14 is vertically and horizontally coplanar with a roller 34 on the second side rail 16. A plurality of pairs of rollers 34 may be arranged along the first and second side rails 14, 16. The pairs may be equally spaced from one another, but other spacing may be used.

The rollers 34 may be rotatably mounted to the rails 14, 16 such as with axles 36. The axles 36 may extend through the second transverse leg 22 of the first side wall 14 and through the central flange 28 of the second side rail 24. Inboard ends of the axles 36 may support the rollers 34 thereon, such as in a cantilevered fashion. Outboard ends of the axles 36 may be fitted with nuts 38 that secure the axles 36 to the side walls 14, 16.

In some embodiments, the upper edge 32 of the second transverse leg 22 of the first side rail 14 may have notches 40. The notches 40 may extend into the first side rail 14 a predetermined height and length, and in some cases the notches may be identical to one another. The notches 40 may be open at the top, or they may be enclosed by the material of the side wall 14. The notches 40 extend from an inboard wall 42 to an outboard wall 44 of the first side rail 14. The notches 40 may be spaced apart from one another along the length second transverse leg 22. The spacing may be equal, or it may be variable. While notches 40 are mentioned for the first side rail 14, notches 40 may also be located in the second side rail 16.

As noted above, there may be one more crosspieces 18 connecting the first and second side rails 14, 16; the crosspieces 18 may be the same, similar or different from one another in their construction. In one example, a front first frame crosspiece 46 and an intermediate first frame crosspiece 48 may extend continuously from the first side rail 14 to the second side rail 16. The front first frame crosspiece 46 and the intermediate first frame crosspiece 48 may have upper and lower sides 50, 52 that are both substantially planar and define a constant thickness between them. These crosspieces 46, 48 maybe substantially the same as one another.

The device 10 may also have a rear first frame crosspiece 54. The rear first frame crosspiece 54 may have an L-shaped cross section with a lower leg 56 and a transverse leg 58. The lower leg 56 may be coplanar with the front first frame crosspiece 46 and the intermediate first frame crosspiece 48. The transverse leg 58 may extend upward and be located adjacent, or in contact with, a rear edge 60 of the first and second side rails 14, 16.

The crosspieces 46, 48, 54 may be located on the lower leg 26 of the second side rail 16 and on the first lower leg 20 of the first side rail 14. In some cases, the crosspieces 46, 48, 54 may be attached to the rails 14, 16 such as through welding and/or mechanical fasteners. The crosspieces 46, 48, 54 may provide strength and rigidity to the device 10.

In some embodiments, the crosspieces 46, 48, 54 may extend outboard from the first and second side rails 14, 16 to provide outboard portions 62 of the crosspieces 46, 48, 54. The outboard portions 62 may all extend outboard from the side rails 14, 16 in the same amount, or the amounts may vary. Preferably, apertures 64 are defined in the outboard portions 62. The apertures 64 may accept mechanical fasteners, which can be located within a substrate upon which one or more of the crosspieces 46, 48, 54 and thus the device 10 may be attached. Additional apertures may be located in the crosspieces 46, 48, 54 to provide additional attachment locations for the crosspieces 46, 48, 54 and the device 10.

The device 10 may also be provided with a second frame 66. In some embodiments, the second frame 66 may selectively at least partially nest with, or located at least partially, within a portion of the first frame 12.

The rollers 34 may selectively engage with the second frame 66. In one embodiment, the rollers 34 may at least partially contact an outer roller channel 68 of the second frame 66. The outer roller channel 68 may have a C-shaped cross-section where the C opens in the outboard direction. The C-shape may be formed by a central flange connecting parallel upper and lower flanges; the upper and lower flanges may be extend transversely to the central flange. The rollers 34 may be in contact with all or some of the C-shape to facilitate movement of the outer roller channel 68 with respect to the fixed first frame 12. While shape and orientation of the outer roller channel 68 is described, other shapes and orientations may be used.

The outer roller channel 68 may be connected to an inner roller channel 70. The inner roller channel 70 may have a C-shape formed by a central flange connecting parallel upper and lower flanges, where the C may open in the inboard direction.

The central flange of the outer roller channel 68 may be connected to the central flange of the inner roller channel 70. In some embodiments, the connection may be such as a direct connection. It may also be that the two parts are formed as a single piece so that the two channels 68, 70 are back to back. Regardless whether the channels 68, 70 were originally formed as one piece or two, it may be preferred that the respective C-shapes face away from another. It may also be that the lower flange of the inner roller channel 70 is not coplanar with the lower flange of the outer roller channel 68. In some cases, it may be that the upper channel of the outer roller channel 68 is located approximately halfway between the upper and lower flanges of the inner roller channel 70. All the flanges of the inner roller channel 70 and the outer roller channel 68 may be parallel, but not coplanar, one another.

The inner roller channel 70 may receive one or more rollers 72 and/or friction reducing devices. The rollers 72 and friction reducing devices may be as described above. The rollers 72 and/or friction reducing devices may be mounted to a lower support member 74 of a tray 76. If friction reducing devices are used they may be connected to the member 74 such as with mechanical fasteners or the like. If rollers 72, or the like, are to be used they may be connected to the tray 76 such as noted above (e.g., axles and nuts). The rollers 72 and friction reducing devices may facilitate relative movement of the tray 76 with respect to the outer and inner roller channels 68, 70.

From the above, it may be appreciated that the first frame 12 may be fixed to a substrate, and the second frame 66 may move with respect to the first frame 12, and that the tray 76 may move with respect to the second frame 66. The degree of movement of the second frame 66 and the tray 76 may be full extensions or only partial extensions and in either case the extensions may be controlled by stops that the rollers 72 or friction reducing devices may contact that are located in the inner and/or outer roller channels 68, 70.

A tray 76 is mentioned above, and one embodiment of a tray 76 is depicted in the figures. A tray 76, however, is not the only structure that may be used. Instead, one or more trays, drawers, shelves, flat surfaces, boxes (open or closed top/sides), and/or other related containers and/or surfaces may be used.

The lower support member 74 may extend at least partially parallel the outer roller and/or inner roller channel 68, 70. In some embodiments, the lower support member 74 may extend the length of the tray 76. In such embodiments, it may be that there are two or more lower support members 74. The lower support members 74 may extend parallel one another along a bottom surface 80 of the tray 76 to provide strength and rigidity to the tray 76.

The embodiment of the tray 76 depicted in the figures may have a base 78 and upstanding edge portions 80 that extend upwardly from the base 78 at an angle. The angle of the edge portions 80 to the base 78 may be such as substantially transverse. The upstanding edge portions 80 may be located about all, some or one of the base 78. In the depicted embodiment, the upstanding edge portions 80 are located around three of the four sides, with the front edge 82 being open. An open front edge 82 may facilitate loading and unloading items from the tray 76. An upper surface 84 of the base 78 may be substantially planar but it also may be non-planar, and/or divided into various compartments or storage areas.

The tray 76 may also have one or more handles 86 attached thereto. In some embodiments, the handle 86 may be such as a fixed handle; the handle 86 may also be one that is not designed to mechanically engage other structures.

The handle 86 may be attached to a front portion 88 of the tray 76, such as with mechanical fasteners. In one embodiment, the front portion 88 may be such as a flange that may extend downwardly from the tray base 78. The handle 86 may extend substantially the width of the tray 76.

Figure 5:
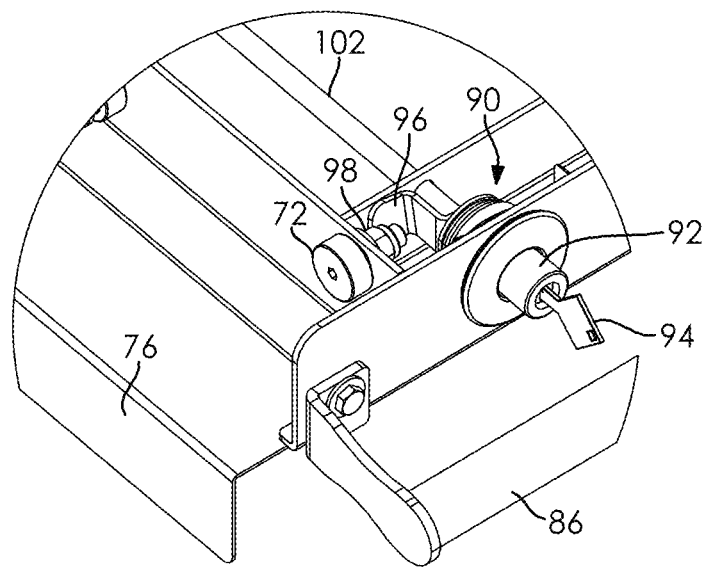
FIG. 5 is a detail from FIG. 4.

The front portion 88 may support a portion of a locking device 90. The locking device 90 may be comprised of a lock cylinder 92, which may be seen in FIG. 5. The lock cylinder 92 may selectively receive a key 94 to lock and unlock the cylinder 92. In other embodiments, the locking device may be a combination type lock or another selective locking device.

In a locked condition, the lock cylinder 92 may move a locking lever 96 into engagement with a stop 98 located behind the front portion 88. When the locking lever 96 is located behind the stop 98, the tray 76 cannot be moved with respect to the first or second frames 12, 66. In an unlocked condition, the locking lever 96 is cleared from the stop 98 and the tray 76 can be move with respect to the first and/or second frame 12, 66.

In some embodiments, the lock cylinder 92 may be selectively movable along a longitudinal axis 100 of the device 10. Preferably, the lock cylinder 92 can be moved parallel the axis 100. Longitudinal movement of the lock cylinder 92 may be imparted by a user pressing the lock cylinder 92 in the longitudinal direction.

In some embodiments, the lock cylinder 92 may be connected, directly or indirectly, to a lock bar 102. The lock bar 102 may be such a rod, tube or simply a length of material regardless of shape, size or single or multi-piece construction. The lock bar 102 may extend from the lock cylinder 92, through one or more bar supports 104, along the tray 76.

The bar supports 104 may extend substantially transverse the direction of the lock bar 102. They may be connected to the sides of the second frame 66, such as the lower support member 74. While bar supports 104 extending from one lower support member 74 to another lower support member 74 are depicted, shorter bar supports 104 may be provided. The bar supports 104 may assist in supporting and/or guiding the lock bar 102.

Figure 6:
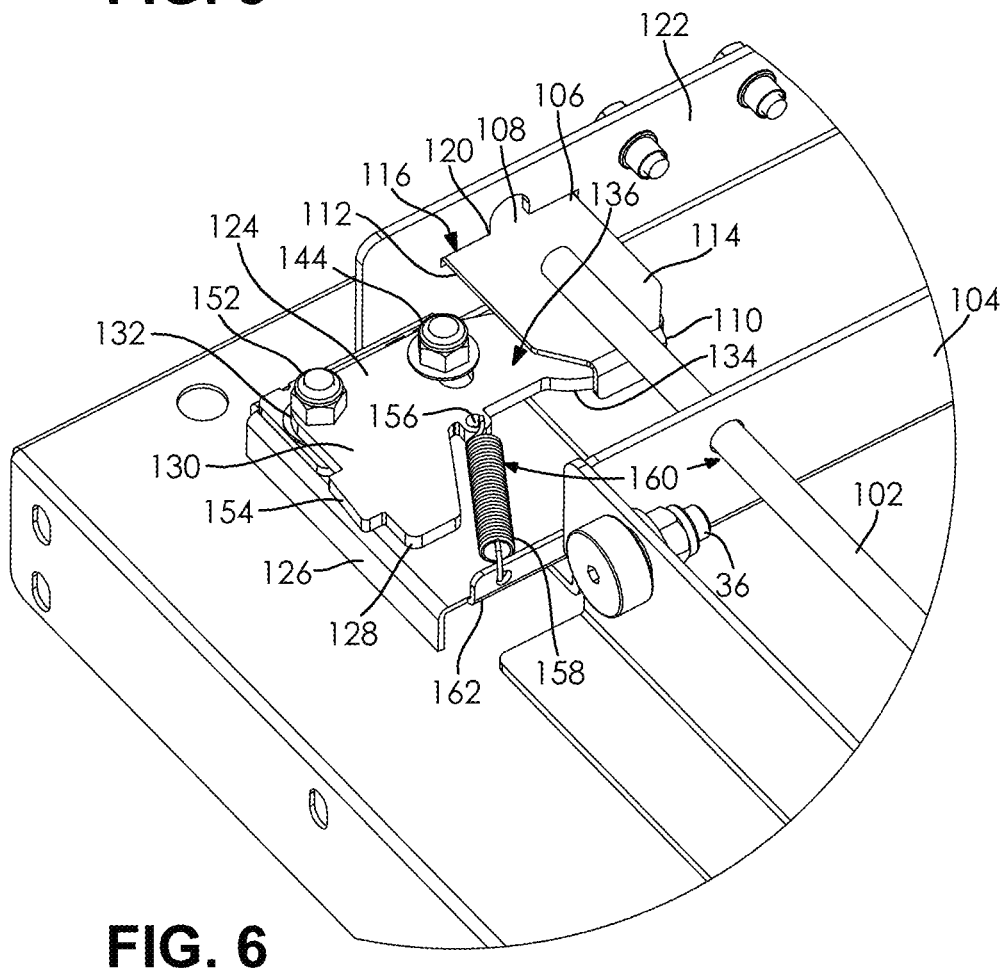
FIG. 6 is a partial, schematic, lower perspective view of components of the device in an unlocked condition.
Figure 7:
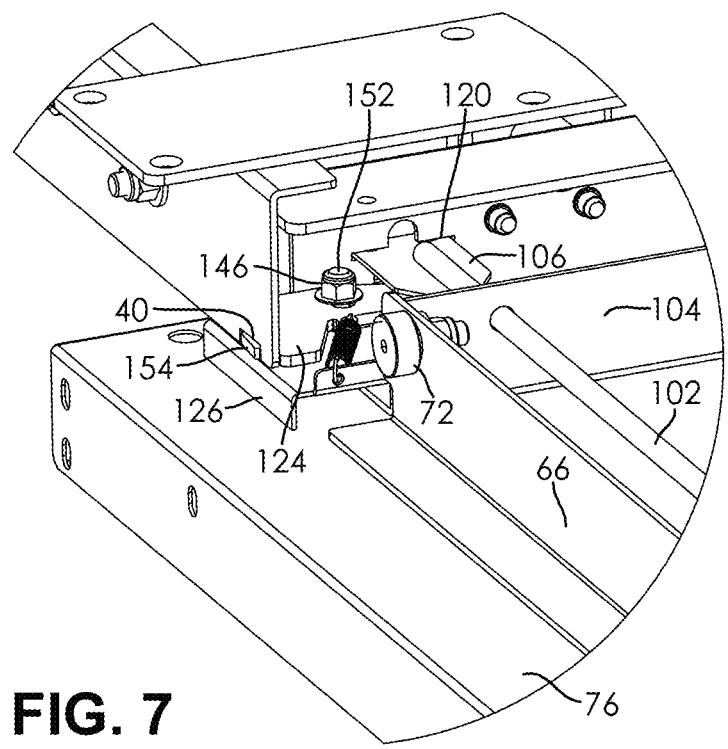
FIG. 7 is another partial, schematic lower, perspective view of components of the device in a locked condition.
Figure 8:
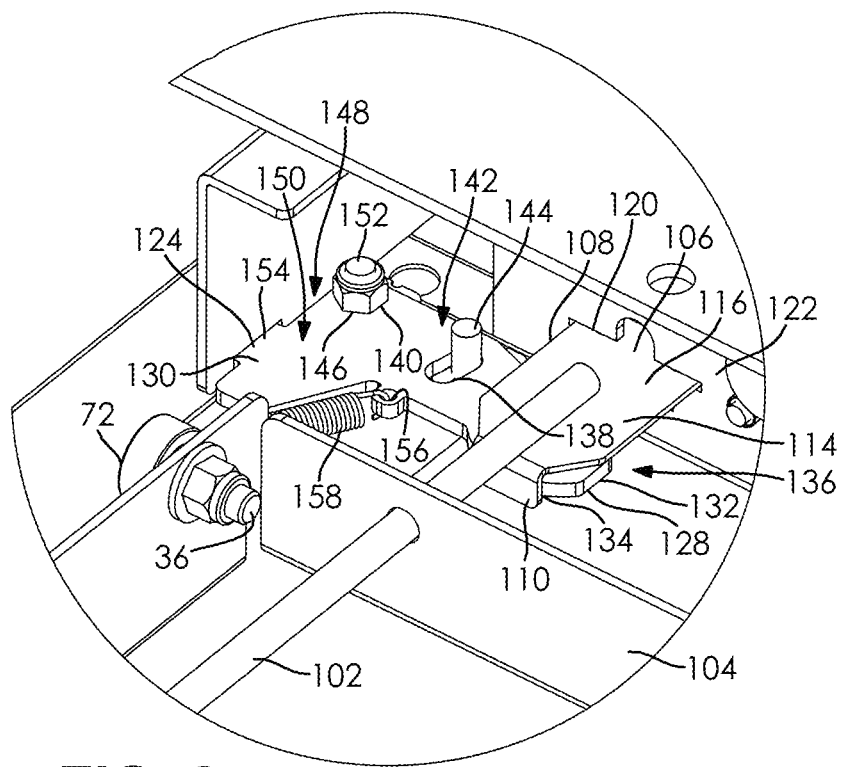
FIG. 8 is another partial, schematic, lower, perspective view of the components of the device in the locked condi- tion.

In some embodiments which may be appreciated in FIGS. 6, 7 and 8, a paddle 106 may be connected to the end portion of the lock bar 102. The paddle 106 may be connected opposite the lock cylinder 92 on the lock bar 102. The paddle 106 may have a body portion 108 and a flange portion 110. The body portion 108 may be plate-like in its construction with a generally rectangular or square shape, but other shapes may be used. The body portion 108 may have an upper surface 112 and a lower surface 114 that may be substantially parallel one another.

The body portion 108 may have an insert portion 116 and the flange portion 110. The insert portion 116 may be located in a paddle support aperture 120 in a rear plate 122 of the second frame 66. The paddle support aperture 120 may have a complementary shape to the insert portion 116. The paddle support aperture 120 supports the insert portion 116 and permits movement of the insert portion 116 within the paddle support aperture 120.

Opposite the insert portion 116, the flange portion 110 may be located on the body portion 108. The flange portion 110 may extend transverse the body portion 108 and it may extend upwardly from the lock bar 102.

The flange portion 110 may connect with a lever 124. The lever 124 may be connected to the tray base 78, or to a lever support 126, which is connected to the tray base 78. The lever 124 may have an upper and a lower surface 128, 130 defining a substantially constant thickness between them, and which may be parallel one another. The upper surface 128 may be in direct contact with the tray base 78, or the lever support 126.

A multi-faceted perimeter portion 132 may bound the upper and lower surfaces 128, 130. The perimeter portion 132 may have a flange receiving portion 134 that has a complementary shape to at least a portion to the flange portion 110. By way of one example, the flange receiving portion 134 may be a planar surface, or flat, and the flange portion 110 may have a planar surface where the two planar surfaces may directly contact one another at a substantially planar intersection. The contact is such that the paddle 106 is capable of selectively moving the lever 124. The flange receiving portion 134 may be on a first portion 136 of the lever 124.

The lever 124 may also have at least one pivot aperture. The aperture may be located anywhere in the lever 124 and it may extend through the lever 124 from the upper surface 128 to the lower surface 130. In some embodiments, the lever 124 has a first and a second pivot aperture 138, 140.

The first pivot aperture 138 may have the shape of a circle or an oval. If the first pivot aperture 138 is an oval shape, the oval may generally extend along the longitudinal axis 100 of the device 10. The first pivot aperture 138 may be located in approximately a middle portion 142 of the lever, approximately between the second pivot aperture 140 and the flange receiving portion 134.

The first pivot aperture 138 may receive a first pivot 144 therethrough. The first pivot 144 may be fixed, such as to the lever support 126, and by selective movement of the lever 124, the first pivot aperture 138 may selectively move about the first pivot 144 but limited by the aperture perimeter. The first pivot 144 may have a substantially round cross-section. In some embodiments, the first pivot 144 may be such as a threaded fastener. A nut 146 may be located on the lower end of the first pivot 144 and the nut 146 may assist in securing the lever 124 to the pivot 144.

The second pivot aperture 140 may be circular. It may be located in a corner portion 148 of the lever 124, such as approximately diagonally opposite the flange receiving portion 134. The second pivot aperture 140 may be in a second portion 150 of the lever 124. The second pivot aperture 140 may receive a second pivot 152 there though. The second pivot 152 may be fixed and with selective movement of the lever 124, the lever 124 may move about the second pivot 152. In some embodiments, the second pivot 152 may be such as a threaded fastener. A nut 146 may be located on the lower end of the second pivot 152 and the nut 146 may assist in securing the lever 124 to the pivot 152 as well as the tray 76 or lever support 126.

The lever 124 may have a locking pawl 154 on the perimeter portion 132 of the lever 124 adjacent the second pivot aperture 140. The locking pawl 154 may extend in the outboard direction in the form of a single tooth although other shapes and devices may be used. The locking pawl 154 may be one piece, integrally formed and unitary with the lever 124. As such, the locking pawl 154 only moves with the lever as it is fixed thereto. The locking pawl 154 may assist in defining the perimeter of the lever 124, as well as the upper and lower surfaces 128, 130 of the lever 124.

In some embodiments, a biasing member aperture 156 may be located forward of the first pivot aperture 138 on the lever 124. The aperture 156 may be created by an extension of the perimeter portion 132 or the aperture 156 may be located within the perimeter portion 132. The aperture 156 may extend through the lever 124 from the upper surface 128 to the lower surface 130.

One end of a biasing member 158 may be attached to the biasing member aperture 156. The biasing member 158 may be such as a coil spring where a portion of the spring is located within the aperture 156 to secure the biasing member 158 to the aperture 156. While a coil spring is mentioned, other biasing members may be used, including other types of springs, motors, and/or pneumatic pistons. When a coil spring is selected, it may be such as an extension spring that provides an opposing force when stretched.

The biasing member 158 may extend at an angle 160 from the biasing member aperture 156. The angle 160 may be such as an acute angle, as measured from the lock bar 102. In some embodiments, the biasing member 158 may generally extend in the same plane as the lever 124.

An opposite end of the biasing member 158 may be attached to the lever support 126. In some embodiments, the lever support 126 may have a downwardly extending biasing member flange 162 to which the opposite end of the biasing member 158 may attach.

The lever support 126 may be a structure that connects with the tray base 78 and extends therefrom. The lever support 126 may provide a fixed surface on which the moveable lever 124 operates and may move with respect to.

The lever support 126 may also provide a gap from the tray base 78 in which fasteners may be located. The lever support 126 may also locate the lever 124 at the appropriate distances from the tray base 78 to reach the lock bar 102 and paddle 106.

The locking pawl 154 may be selectively located within the notches 40 in the first frame 12. The biasing member 158 urges the locking pawl 154 in the outboard direction and into a notch 40. The locking pawl 154 may be located in any of the number of notches 40 along the first frame 12 to secure the tray 76 in a particular longitudinal position. The locking pawl 154 may be urged out of the notch 40 by pushing the lock cylinder 92 in the longitudinal direction. Longitudinal movement of the lock cylinder 92, longitudinally moves the lock bar 102. The flange portion 110 of the paddle 106, being attached to the lock bar 102 through the paddle 106, then pushes on, or rotates, such as pivots, the lever 124 in a partial counterclockwise orientation. The locking pawl 154, being connected for movement with the lever 124, can then be moved, such as pivoted or rotated, out of the notch 40, which permits the tray 76 to move with respect to the first frame 12.

The various structures may be constructed of a robust material capable of withstanding hard use and environmental conditions. In some embodiments, metal, such as, but not limited to, stainless steel, and/or aluminum and aluminum alloys may be used for the various parts. Other materials other than metal may be used, however, and they include, but are not limited to, composite materials, fiberglass, polymers, plastics and/or wood.

The device 10 assists in providing easy access to the cargo portion of a vehicle in a simple yet robust manner. In some cases, the user can pull the device 10 from the cargo portion to provide access to the items thereon from either side of the device 10, as well as from the end of the device 10. When access is no longer needed, the device 10 can be located substantially back in the vehicle, resulting no additional expansion of the vehicle footprint or profile.

In accordance with the provisions of the patent statutes, the device has been described in what is considered to represent its preferred embodiments. However, it should be noted that the device can be practiced otherwise than as specifically illustrated and described without departing from its spirit or scope.

What is claimed is:

1. A locking system for a vehicle slide out device, comprising:
    a paddle having a body portion and a flange portion;
    a lever connected to the paddle wherein the lever has a locking pawl, and at least one pivot aperture;
    a lever support located adjacent the lever, the lever support having at least one pivot extending through the at least one pivot aperture;
    a frame member having a plurality of notches selectively aligned with the locking pawl,
    wherein the lever has a first pivot aperture and a second pivot aperture,
    wherein the first pivot aperture is substantially circular, and the second pivot aperture is oval shaped.

2. The locking system of claim 1, wherein the paddle has a portion connected to a lock bar and another portion supported within an aperture of the frame member.

3. The locking system of claim 1, wherein the paddle has a body portion with an upper surface and a lower surface, wherein the surfaces are substantially parallel, wherein the paddle has the flange portion extending substantially transverse the body portion.

4. The locking system of claim 1, wherein the lever has a first portion with a flange receiving flat in contact with the flange portion of the paddle, and the lever has a second portion with the locking pawl thereon, wherein the lever has an upper surface and a lower surface that are substantially parallel one another.

5. The locking system of claim 1, wherein a first pivot and a second pivot extend through the first pivot aperture and the second pivot aperture, respectively, wherein the first and second pivots each have a cylindrical shape.

6. The locking system of claim 1, further comprising a biasing member having one end connected between a first portion and a second portion of the lever.

7. The locking system of claim 6, wherein the biasing member and a lock bar define an acute angle between them.

8. A locking system for a vehicle slide out device, comprising:
   a paddle having a flange portion;
   a lever at least partially overlapping the paddle wherein the flange portion contacts a first portion of the lever, wherein a second end portion of the lever has a locking pawl,
   wherein the lever has first and second differently shaped pivot apertures laterally offset from one another,
   first and second pivots extending through the first and second pivot apertures, respectively, and
   a biasing member connected to the lever between the first portion and the second portion.

9. The locking system of claim 8, wherein the flange portion of the paddle is adapted to selectively pivot the lever in a first direction.

10. The locking system of claim 9, wherein the biasing member is adapted to selectively pivot the lever in a second direction, opposite the first direction.

11. The locking system of claim 8, wherein the first pivot aperture is adapted to rotate about the first pivot, and the second pivot is adapted to selectively slide along the second pivot aperture which is oval shaped.

12. The locking system of claim 8, wherein the biasing member is coplanar with the lever and positioned to selectively urge the locking pawl into engagement with notches in a frame member.

13. A locking system for a vehicle slide out device, comprising:
   a lock bar having a first end portion and a second end portion;
   a lock device located at the first end portion of the lock bar;
   a paddle located at the second end portion of the lock bar;
   a lever connected to the paddle wherein the lever has a locking pawl, first and second pivot apertures and a first biasing member connection;
   a lever support located adjacent the lever, the lever support having first and second pivots extending through the first and second pivot apertures, respectively, and a second biasing member connection; and
   a biasing member extending between the first biasing member connection and the second biasing member connection.

14. The locking system of claim 13, wherein the lock bar, lock device, paddle, lever, lever support and biasing member are connected for movement with a tray.

15. The locking system of claim 13, wherein the lock device comprises a lock cylinder adapted for selective movement coaxial with the lock bar.

16. A locking system for a vehicle slide out device, comprising:
   a paddle having a body portion and a flange portion;
   a lever connected to the paddle wherein the lever has a locking pawl and an oval shaped pivot aperture;
   a lever support located adjacent the lever, the lever support having a pivot adapted to move along the length of the pivot shaped aperture; and
   a frame member having a plurality of notches selectively aligned with the locking pawl.

\* \* \* \* \*